United States Patent
Miyazaki et al.

(10) Patent No.: US 8,236,363 B2
(45) Date of Patent: Aug. 7, 2012

(54) METHOD FOR PRODUCING INSTANT NOODLES

(75) Inventors: Yoshifumi Miyazaki, Osaka (JP); Kunihiko Yoshida, Osaka (JP); Rintaro Takahashi, Osaka (JP); Yusuke Wada, Osaka (JP); Shinji Matsuo, Osaka (JP); Mitsuru Tanaka, Osaka (JP)

(73) Assignee: Nissin Foods Holdings Co., Ltd., Osaka (JP)

( * ) Notice: Subject to any disclaimer, the term of this patent is extended or adjusted under 35 U.S.C. 154(b) by 0 days.

(21) Appl. No.: 13/000,979

(22) PCT Filed: Nov. 9, 2009

(86) PCT No.: PCT/JP2009/005962
§ 371 (c)(1),
(2), (4) Date: Dec. 22, 2010

(87) PCT Pub. No.: WO2011/013185
PCT Pub. Date: Feb. 3, 2011

(65) Prior Publication Data
US 2011/0129582 A1 Jun. 2, 2011

(30) Foreign Application Priority Data
Jul. 31, 2009 (JP) .................. 2009-179968

(51) Int. Cl.
*A23L 1/16* (2006.01)

(52) U.S. Cl. ......... 426/451; 426/496; 426/557; 426/549

(58) Field of Classification Search ............ 426/451
See application file for complete search history.

(56) References Cited

U.S. PATENT DOCUMENTS

| | | | |
|---|---|---|---|
| 4,483,879 A * | 11/1984 | Sugisawa et al. | 426/451 |
| 4,539,214 A * | 9/1985 | Winter et al. | 426/557 |
| 6,541,059 B2 * | 4/2003 | Oh et al. | 426/557 |

FOREIGN PATENT DOCUMENTS

| | | |
|---|---|---|
| JP | 53-6444 | 1/1978 |
| JP | 58-081749 | 5/1983 |
| JP | 59-048056 | 3/1984 |
| JP | 59-098660 | 6/1984 |
| JP | 63-56787 | 11/1988 |
| JP | 3-41148 | 6/1991 |
| JP | 2003-038114 | 2/2003 |
| JP | 2003-174853 | 6/2003 |
| JP | 3535145 | 6/2004 |
| JP | 2006-166766 | 6/2006 |
| JP | 2007-060904 | 3/2007 |
| SU | 1582971 A3 | 7/1990 |

OTHER PUBLICATIONS

Issei Hirayama, "Revision of Heat Process for Quality Improvement; Noodle Series [I] Instant Noodles," The Food Industry, Dec. 30, 1992, vol. 36, No. 24, pp. 90-96, with Partial English Translation.
Russian Decision of granting a patent for invention, with English translation, issued in Russian Patent Application No. 2011107317, dated Jan. 30, 2012.
European Search Report issued in European Patent Application No. 09847778.9 dated Mar. 23, 2012.
C. Pronyk et al. "Effects of Superheated Steam Processing on the Textural and Physical Properties of Asian Noodles". Drying Technology, vol. 26, No. 2, pp. 192-203. Jan. 31, 2008.
C. Pronyk et al. "Optimum Processing Conditions of Instant Asian Noodles in Superheated Steam". Drying Technology, vol. 26, No. 2, pp. 204-210. Jan. 31, 2008.

* cited by examiner

*Primary Examiner* — Elizabeth Gwartney
(74) *Attorney, Agent, or Firm* — McDermott Will & Emery LLP

(57) ABSTRACT

The present invention provides a method for producing instant noodles having fresh noodle-like texture and flavor and having an excellent reconstitution property even if the noodles are thick. In the present invention, superheated steam flow is directly sprayed to raw noodle strings for 5 to 50 seconds such that a temperature of superheated steam to which surfaces of the noodle strings are exposed becomes 125 to 220° C., the noodle strings are supplied with moisture using water or hot water, the noodle strings are further steamed by directly spraying the superheated steam flow to the noodle strings for 5 to 50 seconds and/or steamed by using non-superheated steam, and the noodle strings are dried to produce the instant noodles.

5 Claims, No Drawings

METHOD FOR PRODUCING INSTANT NOODLES

RELATED APPLICATIONS

This application is the U.S. National Phase under 35 U.S.C. §371 of International Application No. PCT/JP2009/005962, filed on Nov. 9, 2009, which in turn claims the benefit of Japanese Application No. 2009-179968, filed on Jul. 31, 2009, the disclosures of which Applications are incorporated by reference herein.

TECHNICAL FIELD

The present invention relates to a method for producing instant noodles using superheated steam in a steaming step.

BACKGROUND ART

Since instant noodles are extremely low in moisture content and are in a dry state, they excel in long-term storage. In addition, the instant noodles can be reconstituted and eaten only by immersing the instant noodles in boiling water and leaving them for several minutes or by boiling the instant noodles in boiling water for about one to several minutes. Thus, the instant noodles are extremely convenient food products.

Generally, the instant noodles are produced such that: a noodle dough is prepared using cereal flour, such as wheat flour, as a main raw material; the dough is rolled out and cut to produce raw noodle strings; raw noodles strings are steamed or boiled, i.e., subjected to a gelatinization process; the noodle strings are cut into one meal amount; and the noodle strings are dried (moisture of the noodle strings are removed). Depending on the type of this drying step, the instant noodles are classified broadly into fried noodles and non-fried noodles. The fried noodles are noodles produced by frying the gelatinized noodles in oil having a high temperature of about 150° C. to dry the noodles. In contrast, the non-fried noodles are noodles produced by drying the gelatinized noodles by a method, such as hot-air drying, microwave irradiation, low-temperature air drying, or freeze dry, other than the frying process.

In the gelatinization process before the drying step, starch is changed into an easily digestible form, i.e., $\alpha$-starch by a water-adding and heating process. The starch contained in cereals, such as wheat flour, is called $\beta$-starch, and the $\beta$-starch is hardly acted upon by a digestive enzyme and hardly digested. However, by adding water to the $\beta$-starch and heating it, its molecular structure breaks and paste-like gelatinized starch ($\alpha$-starch) is produced. The $\alpha$-starch is easily acted upon by the digestive enzyme and easily digested. It is known that the gelatinization process significantly influences the quality of noodles to be eaten (see NPL 1 for example).

In the gelatinization process of the instant noodles, normally, steam generated by a boiler is introduced to a steam chamber, and the noodle strings are steamed by this steam. Generally, the cut raw noodles strings are steamed by saturated steam at a temperature close to the boiling point of water. Moreover, it is known that the gelatinization process of the raw noodles is carried out by not the saturated steam but the superheated steam (see PTL 1 and PTL 2 for example). The superheated steam is steam generated by forcibly increasing the temperature of the saturated steam to 100° C. or higher under atmospheric pressure.

PTL 1 describes that steamed noodles having viscoelasticity are obtained by carrying out steaming for a comparatively long period of time using the superheated steam in the gelatinization process of the raw noodles, but does not describe the evaluation of the instant noodles. PTL 2 describes that the raw noodles having high moisture content are gelatinized and dried by the superheated steam and a moisture evaporation rate of the fresh noodles at this time is adjusted to obtain dried noodles which are uniformly swelled without cracks or blisters.

However, a known problem is that in the case of carrying out the gelatinization process of the noodle strings using the superheated steam, due to high heat amount of the superheated steam, a drying rate becomes higher than a gelatinization rate, the gelatinization does not adequately proceed up to a center portion of each noodle string, and the quality of the noodle becomes low in smoothness. Further, to solve this problem, in a case where moisture is supplied to the noodle strings which are being steamed in a steamer, the noodle strings are steamed well. However, a known problem is that since the noodle strings absorb the moisture more than necessary, and the moisture is quickly removed from the noodle strings in the subsequent drying step, the noodle strings foam excessively and their structures become rough, and therefore, the noodle strings lose texture soon by boiling (see paragraphs 0007 and 0008 in PTL 3).

To solve this problem, PTL 3 describes that heated saturated steam is used in a steam atmosphere of a steaming step in the method for producing the instant noodles, an ambient temperature around the noodle strings is set to be higher than 100° C. and not higher than 125° C., and a time for the steaming step is set to about one to three minutes. PTL 3 describes that with this, it is possible to produce the instant noodles having smooth and elastic noodle quality and clear appearance without any surface roughness of the noodle strings, such as blisters or foaming.

In addition, proposed are to use the superheated steam for not the steam boiling but the drying of the food product (see PTL 4 for example), to adsorb a liquid containing brine water to a mass of the instant noodles subjected to the drying process and dry the mass again using the superheated steam (see PTL 5), and to throw the instant noodles subjected to the drying process into the superheated steam to give flexibility to the noodle strings and then compress and shape the mass (see PTL 6).

CITATION LIST

Patent Literature

PTL 1: Japanese Laid-Open Patent Application Publication No. 2003-38114
PTL 2: Japanese Examined Patent Application Publication No. 63-56787
PTL 3: Japanese Patent No. 3535145
PTL 4: Japanese Examined Patent Application Publication No. 3-41148
PTL 5: Japanese Laid-Open Patent Application Publication No. 2006-166766
PTL 6: Japanese Laid-Open Patent Application Publication No. 2007-60904

Non Patent Literature

NPL 1: "Revision of Heat Process for Quality Improvement; Noodle Series [I] Instant Noodles" written by Issei Hirayama in The Food Industry, Dec. 30, 1992, Vol. 36, No. 24, p. 90-96

SUMMARY OF INVENTION

Technical Problem

In the case of eating and comparing the instant noodles currently available in the market and common fresh noodles, these noodles are significantly different from each other in texture and flavor. Specifically, the surfaces of the noodle strings of the fresh noodles are commonly soft, and the center portions thereof are hard. In contrast, the surfaces of the noodle strings of the instant noodles are firm, and it is difficult for the instant noodles to obtain the texture of the fresh noodles, i.e., so-called elastic texture. Moreover, the instant noodles lack wheat flour-like flavor derived from the raw material. In this regard, the instant noodles are again different from the fresh noodles having wheat flour flavor.

Further, the instant noodles need to be reconstituted by the addition of boiling water or short-time boiling. Therefore, a problem is that in a case where the noodle strings are thick, it is difficult to reconstitute them, so that thick noodle strings cannot be produced as the instant noodles.

In view of current situations, an object of the present invention is to provide a method for producing instant noodles having fresh noodle-like texture and flavor and an excellent reconstitution property even if the instant noodles are thick.

Solution to Problem

The present inventors have studied a method for producing instant noodles having fresh noodle-like texture and flavor. As a result, the present inventors have found that the instant noodles having fresh noodle-like texture and flavor and satisfactory reconstitution property can be produced by: using the superheated steam in the gelatinization process of the noodle strings; selecting extremely-high-temperature steam as the superheated steam; not filling a steam chamber with the superheated steam but directly spraying the superheated steam flow to the surfaces of the noodle strings for a short period of time; supplying the moisture to the noodle strings after the spraying; and carrying out the steaming step again. Thus, the present inventors have achieved the present invention.

To be specific, the present invention is a method for producing instant noodles, including: a first steaming step of steaming raw noodle strings by directly spraying superheated steam flow to the raw noodle strings for 5 to 50 seconds such that a temperature of superheated steam to which surfaces of the noodle strings are exposed becomes 125 to 220° C.; a first moisture supplying step of using water or hot water to supply the noodle strings with moisture after the first steaming step; a second steaming step of steaming the noodle strings after the first moisture supplying step by directly spraying the superheated steam flow to the noodle strings for 5 to 50 seconds and/or steaming the noodle strings after the first moisture supplying step by using non-superheated steam; and a drying step of drying the noodle strings after a steaming process to produce the instant noodles.

In the first steaming step, the superheated steam flow can be sprayed and the non-superheated steam can be used at the same time.

The method for producing the instant noodles according to the present invention can further includes: a second moisture supplying step of using the water or the hot water to supply the noodle strings with the moisture after the second steaming step; and a third steaming step of steaming the noodle strings after the second moisture supplying step by directly spraying the superheated steam flow to the noodle strings for 5 to 50 seconds and/or steaming the noodle strings after the second moisture supplying step by using the non-superheated steam.

The drying step may be a step of drying the noodle strings by a fry drying process, a hot-air drying process, or a freeze dry process.

Advantageous Effects of Invention

In accordance with the producing method of the present invention, it is possible to produce such elastic instant noodles that a texture thereof is similar to that of fresh noodles as compared to conventionally produced instant noodles, the surfaces of the noodle strings are soft, and the center portions of the noodle strings are hard. Further, it is possible to produce the instant noodles which are high in water-absorbing speed when cooking and are capable of being reconstituted under reconstitution conditions of general instant noodles even if the noodles are thick, even though it has been difficult to reconstitute thick instant noodles. Moreover, the instant noodles are excellent in flavor and have wheat flour-like flavor. In a case where the instant noodles are Chinese noodles, unique flavor including so-called brine water smell increases.

In addition, since a time necessary for the steaming step can be decreased, the productivity of the instant noodles can be improved.

DESCRIPTION OF EMBODIMENTS

Hereinafter, a method for producing instant noodles of the present invention will be specifically explained in order of steps.

Before Steaming Step

In the present invention, first, raw noodle strings are prepared by an ordinary method. Specifically, auxiliary materials and kneading water are added to material powder, such as wheat flour, and these are kneaded. Then, the mixture is combined, rolled out, and cut to prepare raw noodle strings. Instead of the above method for producing the noodle strings by cutting, a method for producing the noodle strings by extruding the mixture using an extruder may be used. Used as the material powder that is a main raw material is wheat flour, starch, or the like. As the auxiliary materials, brine water, salt, thickener, gluten, egg white, pigment, and the like may be added according to need.

In the present invention, the thickness of the noodle string to be prepared is not especially limited. For example, the noodle strings each having a thickness of 1.0 to 3.0 mm may be prepared. In a case where the noodle strings each having a thickness of especially 1.5 to 3.0 mm are produced as the instant noodles by a conventional method, the water is not adequately absorbed into an inner portion of the noodle string, and the reconstitution property is low. However, in accordance with the producing method of the present invention, a water-absorbing property of the instant noodles improves, so that the reconstitution property also improves. Therefore, the instant noodles are adequately reconstituted by common reconstitution conditions (by immersing the instant noodles in boiling water and leaving them for several minutes or by boiling the instant noodles in boiling water for about one to several minutes), so that the instant noodles can be eaten.

Next, the prepared raw noodle strings are steamed. The steam boiling of the present invention is characterized in that after a first steaming step using a superheated steam flow, the moisture is supplied to the noodle strings, and a second steaming step using a steam flow is carried out.

First Steaming Step

In the first steaming step, the superheated steam flow is directly sprayed to raw noodle strings placed in a steaming chamber.

In the present invention, directly spraying the superheated steam flow to the noodle strings denotes that the flow of the superheated steam ejected from an ejection hole into the steaming chamber does not contact the other solid substances before contacting the noodle strings, and in addition, the steam flow contacts the surfaces of the raw noodle strings before the steam flow loses speed and completely spreads. In the conventional steaming step using the superheated steam, the steaming chamber is filled with the superheated steam, and the steam boiling is carried out under superheated steam atmosphere, but the flow of the superheated steam is not directly sprayed to the surfaces of the noodle strings.

By directly spraying the superheated steam flow to the noodle strings as above, it is possible to produce the instant noodles having fresh noodle-like texture and flavor, i.e., having soft noodle string surfaces and hard center portions, further having a satisfactory reconstitution property, and capable of being reconstituted under conventional reconstitution conditions even if the noodle strings are thick. When the steamed noodles obtained by directly spraying the superheated steam flow to the noodle strings is actually observed with a scanning electron microscope, the surface of each noodle string is smooth, and a layer having an average thickness of about 80 to 90 μm and whose starch particles are completely broken is formed at a surface layer portion of the noodle string. Such structure cannot be seen in the conventional steaming step of the instant noodles. Then, in a case where the degree of gelatinization of the layer having such changed structure is experimentally measured by an enzyme method, the degree of gelatinization of the layer is higher than that obtained by the steaming process using the saturated steam. Meanwhile, the degree of gelatinization of the entire noodle string is equal to or lower than that of the noodle steamed using the saturated steam. Therefore, it is thought that by steaming the noodle strings using the spraying of the superheated steam, a big difference is generated between the degree of gelatinization of the inner portion of the noodle string and the degree of gelatinization of the surface portion of the noodle string. Further, it is confirmed by another experiment that the layer which has caused such special structure change accelerates the water absorption to the noodle strings during the subsequent moisture supply. By such special structure change, effects specific to the present invention as the instant noodles may be finally obtained.

The number of ejection holes through which the superheated steam flow is sprayed to the noodle strings in the steam chamber is not limited. However, it is preferable that a plurality of ejection holes be provided such that the superheated steam flow is uniformly sprayed to the entire noodle strings. Especially, the noodle strings are steamed in the form of a thick mass formed by overlapping the noodle strings one another. Therefore, it is preferable that the superheated steam flow be sprayed from an upper side and a lower side of the noodle strings at the same time such that the superheated steam flow uniformly contacts all the noodle strings.

Used as the superheated steam flow in the present invention is an extremely high-temperature steam flow. The high-temperature superheated steam flow is sprayed such that the temperature thereof to which the surfaces of the noodle strings are exposed, i.e., the temperature thereof which is measured at a periphery very close to the noodle strings falls within a range from 125 to 220° C. If the temperature of the superheated steam flow to which the surfaces of the noodle strings are exposed is out of this range, it is impossible to produce the instant noodles having fresh noodle-like texture, i.e., having soft noodle string surfaces and hard center portions, as with the instant noodles produced by the present invention. It is preferable that the temperature fall within a range from 140 to 180° C.

In the first steaming step of the present invention, such high-temperature superheated steam flow is directly sprayed to the surfaces of the noodle strings for a short period of time, i.e., for 5 to 50 seconds. If the high-temperature superheated steam flow is directly sprayed to the noodle strings for more than 50 seconds, for example, for one minute or longer, the noodle strings become excessively dry. Therefore, even if the moisture is supplied to the noodle strings in the subsequent step, it is impossible to produce the instant noodles which are thick noodles capable of being reconstituted under conventional reconstitution conditions and have fresh noodle-like texture and flavor. Moreover, if the spraying time is too short, adequate changes of the surfaces of the noodle strings cannot be achieved. Although a preferable spraying time depends on the temperature, it is from 15 to 45 seconds. Each of the above-described PTL 1 and PTL 2 discloses only the steaming of one minute or longer.

In the first steaming step, the superheated steam flow and non-superheated steam may be used simultaneously. With this, rapid changes caused by the superheated steam flow can be eased, and unique texture can be given to the noodle strings. The non-superheated steam denotes normal saturated steam. In this case, the ejection hole configured to spray the non-superheated steam flow may be provided separately from the ejection hole configured to spray the superheated steam flow. The ejection hole configured to spray the saturated steam does not have to directly spray the steam to the noodle string and may fill the steam chamber with the steam.

First Moisture Supplying Step

In a subsequent first moisture supplying step, the moisture is supplied by using water or hot water to the noodle strings subjected to the first steaming step. This step can be carried out by, for example, showering the noodle strings with water or hot water or immersing the noodle string with water or hot water.

It is preferable that the temperature of the water or the hot water used for showing or immersing be high, since the texture and flavor of the instant noodles to be produced improve. Specifically, it is preferable that the temperature be 40° C. or higher. Especially, it is most preferable that the temperature be 50° C. or higher. With this, the moisture lost by the superheated steam is compensated, and the texture and flavor of the instant noodles can become more similar to those of the fresh noodles. The moisture supplying step can compensate the moisture of the noodle strings which has been decreased by the spraying of the superheated steam flow in the first steaming step. The amount of water added to the noodle strings can be adjusted depending on the texture and flavor to be obtained. A preferable amount of water is 5 to 30% of the weight of the noodle strings before the steaming.

Second Steaming Step

In a subsequent second steaming step, the superheated steam flow is again sprayed to the noodle strings to which the moisture has been supplied in the first moisture supplying step, and/or the noodle strings to which the moisture has been supplied in the first moisture supplying step are steamed by the non-superheated steam. In the case of using the superheated steam flow in the second steaming step, the superheated steam flow may be used as with the first steaming step or under a different temperature condition from that of the first steaming step, the normal saturated steam may be used, or both the superheated steam flow and the normal saturated steam may be used.

In the case of using the superheated steam flow in the second steaming step, it is preferable that the superheated steam flow be directly sprayed to the noodle strings. In addition, the spraying time is set to a short period of time, i.e., 5 to 50 seconds.

In the case of using the superheated steam flow in the second steaming step, the effects in the first steaming step can be further strengthened, and the changes of the surfaces of the noodle strings as with the first steaming step can be further accelerated. In the case of using the normal steam in the second steaming step, the gelatinization of the noodle strings which was not enough in the first steaming step can be accelerated to a level that the noodle strings can be eaten.

Second Moisture Supplying Step and Third Steaming Step

The noodle strings subjected to the second steaming step can become the instant noodles by the drying step. However, a second moisture supplying step and a third steaming step may be carried out according to need. Here, conditions for carrying out the second moisture supplying step are the same as those of the first moisture supplying step, and conditions for carrying out the third steaming step are the same as those of the second steaming step.

By carrying out the second moisture supplying step and the third steaming step, even especially thick noodles can be reconstituted, and the effects of the present invention can be achieved at higher levels.

Further, the moisture supplying step and the steaming step can be repeated after the third steaming step.

Drying Step

Finally, the noodle strings subjected to the steaming (gelatinization) are subjected to a drying step to remove the moisture of the noodle strings. Thus, the instant noodles are produced. Before the drying step, the noodle strings are normally cut into one meal amount and boxed up in a retainer or the like. The boxed noodle strings are subjected to the drying step. The cutting of the noodle strings may be carried out before the steaming.

The type of the drying step is not especially limited in the present invention. A drying process generally used in producing the instant noodles may be used. Specifically, in addition to a fry drying process, a non-fry drying process, such as hot-air drying, freeze dry, microwave drying, or low-temperature air drying, may be used. The drying step may be carried out by the combination of these processes. Specific conditions of the drying process are not especially limited, but for example, the fry drying process is normally carried out at 130 to 160° C. for about 1 to 3 minutes, and the hot-air drying is normally carried out at 60 to 120° C. for about 15 to 180 minutes. The moisture content of the dried noodle strings may be about 1 to 5 wt % in the case of the fry drying process and about 5 to 10% in the case of the hot-air drying.

The instant noodles produced by the above method have such fresh noodle-like texture that the noodle strings have soft surfaces and hard center portions and have such fresh noodle-like flavor that the noodle strings smell like wheat flour flavor. In addition, the water-absorbing speed when cooking is high, and the reconstitution property is satisfactory. Even if the noodle strings are thick, they can be reconstituted under conventional reconstitution conditions. It is the first time the instant noodles could obtain fresh noodle-like texture and flavor, which is extremely significant. In addition, by the producing method of the present invention, it became possible to produce the instant noodles which can be easily reconstituted even if the noodles are thick, which has been regarded as impossible.

EXAMPLES

Hereinafter, the present invention will be explained in more detail using Examples. However, the present invention is not limited to Examples.

Experiment 1: Verification of Effects of Fried Noodles

Example 1

370 ml of kneading water in which 20 g of salt and 5 g of phosphate were dissolved was added to 1 kg of noodle material powder made of 850 g of wheat flour and 150 g of starch. This was adequately kneaded by a mixer to obtain a noodle dough. The obtained noodle dough was shaped and combined to form a noodle belt. The noodle belt was repeatedly rolled out to become the noodle belt having a final thickness of 1.75 mm. The noodle belt was cut by a cutting blade of a square blade No. 9.

The cut raw noodle strings were steamed by the superheated steam in the first steaming step. As the condition of the superheated steam, high-temperature steam of about 250° C. was generated and supplied at a steam flow rate of 160 kg/h to a tunnel type steam chamber in which a net conveyor moves.

The steam chamber includes the ejection holes configured to directly spray the superheated steam flow from upper and lower sides of the net conveyor to the noodle strings transferred on the net conveyor. Many ejection holes are arranged in a proceeding direction of the conveyor. The noodle strings were steamed by directly spraying the superheated steam flow from the ejection holes to the noodle strings.

A method for measuring the temperature of the superheated steam to which the noodle strings are exposed was to place a temperature sensor on the surfaces of the noodle strings to monitor the temperature of the superheated steam to which the noodle strings are exposed in the steam chamber. The temperature of the superheated steam in the first steaming step was 140° C., and a steaming time was 30 seconds.

Immediately after the noodles steamed by the superheated steam as above were discharged from the steam chamber by the conveyor, water of 60° C. was showered to the noodles to supply the moisture in the first moisture supplying step.

Next, under the same conditions as those of the first steaming step, the noodle strings were steamed by the superheated steam in the second steaming step. Immediately after the steaming, the degree of gelatinization of the noodle string was measured by the enzyme method.

The steamed noodles steamed as above were immersed in a boiling chamber for five seconds. Then, the steamed noodles were immersed in a seasoning liquid, i.e., a lightly salted water. The noodle strings were cut and filled in a retainer having a capacity of 380 ml and fried using palm oil of about 150° C. Thus, the noodle strings were dried.

The instant fried noodles produced as above were cooled down and stored as a sample of Example 1. The weight of the sample was 74 g.

The sample was put in a polystyrene container. 400 ml of the boiling water was poured into the container, and a lid of the container was closed. The sample was left for five minutes to be reconstituted, and then eaten. As a method for evaluating the noodles by eating them, the noodles were evaluated by five experienced panelists. The panelists discussed the texture and flavor of the noodles. A comprehensive evaluation was performed on a scale on which 4 is perfection.

Regarding points of the comprehensive evaluation, 4 points show that both a cooked noodle state and the texture are good, 3 points show that one of the cooked noodle state and the texture is not so good, 2 points show that both the cooked noodle state and the texture are not so good, and 1 point shows that both the cooked noodle state and the texture are bad. It is determined that if the noodles get the highest point that is 4 points, a general consumer can adequately recognize the effects of the superheated steam and be differentiated from conventional products. Thus, 4 points is regarded as a passing point.

Example 2

Example 1 includes the steps of the superheated steam steaming, the water shower, and the superheated steam steaming. In Example 2, the steps of the water shower and the superheated steam steaming were added to Example 1. To be specific, a sample was produced as Example 2 in the same manner as Example 1 by carrying out the superheated steam steaming three times. Steam-boiling conditions and the like were the same as those of the first steaming step of Example 1.

Comparative Example 1

Example 1 includes the steps of the superheated steam steaming, the water shower, and the superheated steam steaming. In Comparative Example 1, the superheated steam steaming was carried out only once, the steps after the first moisture supplying step of Example 1 were not carried out, but the frying process was carried out. To be specific, a sample was produced as Comparative Example 1 in the same manner as Example 1 by carrying out the superheated steam steaming once.

Comparative Example 2

Comparative Example 1 includes the step of carrying out the superheated steam steaming once. In Comparative Example 2, the saturated steam was used instead of the superheated steam of Comparative Example 1. A sample was produced as Comparative Example 2 by carrying out the saturated steam steaming once for 30 seconds. In this case, the steam flow rate was 200 kg/h, the temperature of the steam to which the noodle strings were exposed was about 100° C., and the steaming was carried out using the same steam chamber as Examples 1 and 2 and Comparative Example 1.

Comparative Example 3

Comparative Example 2 includes the step of carrying out the saturated steam steaming once. In Comparative Example 3, the saturated steam steaming was carried out twice under the same conditions as those of Comparative Example 2. A sample was produced as Comparative Example 3 by carrying out the same water shower as Example 1 between two second saturated steam steaming steps.

Result of Examples 1 and 2 and Comparative Examples 1 to 3 are shown in Table 1.

TABLE 1

| | Example 1 | Example 2 | Comparative Example 1 | Comparative Example 2 | Comparative Example 3 |
|---|---|---|---|---|---|
| Sensory Evaluation Score | 4 | 4 | 2 | 2.5 | 2.5 |
| Sensory Evaluation Comment | Both cooked noodle state and texture are good. | Both cooked noodle state and texture are good. | Although hot water soaks, reconstitution is no good and core is hard. | Surfaces are rough and not smooth. Noodles are not adequately cooked and core is hard. | Surfaces are rough and not smooth. Core is hard. |
| Degree of gelatinization after steaming | 55.6% | 59.1% | 50.3% | 51.0% | 63.2% |

Experiment 2: Verification of Effects of Noodles Subjected to Hot-Air Drying

Example 3

350 ml of the kneading water in which 20 g of salt and 8 g of brine water were dissolved was added to 1 kg of the noodle material powder made of 900 g of wheat flour and 100 g of starch. This was adequately kneaded by the mixer to obtain the noodle dough. The obtained noodle dough was shaped and combined to form the noodle belt. The noodle belt was repeatedly rolled out to become the noodle belt having the final thickness of 1.22 mm. The noodle belt was cut by a cutting blade of a round blade No. 20.

The cut raw noodle strings were steamed by the superheated steam in the first steaming step. As the condition of the superheated steam, high-temperature steam of 300° C. was generated and supplied at the steam flow rate of 160 kg/h to the tunnel type steam chamber in which the net conveyor moves.

Since the steam chamber used herein is the same as that used in Example 1, the structure and the like are the same as in Example 1, and the spraying method and the like are also the same as in Example 1.

The temperature of the superheated steam to which the noodle strings were exposed was 170° C. that was higher than that of Example 1, and the steaming time was 30 seconds.

Immediately after the noodles steamed by the superheated steam as above were discharged from the steam chamber by the conveyor, water of 60° C. was showered to the noodles to supply the moisture in the first moisture supplying step.

Next, under the same conditions as those of the first steaming step, the noodle strings were steamed by the superheated steam in the second steaming step.

The steamed noodles steamed as above were immersed in a seasoning liquid containing 10 g/l of salt for several seconds. The noodles were cut into one meal amount that was about 120 g and filled up in a retainer having a capacity of 380 ml. Then, the noodles were dried for about 30 minutes in a hot air drier chamber having a temperature of 90° C. and a wind speed of about 4 m/s.

The instant hot-air dried noodles produced as above were cooled down and stored as a sample of Example 3. The weight of the sample was 65 g.

The sample was put in the polystyrene container. 400 ml of the boiling water was poured into the container, and the lid of the container was closed. The sample was left for four minutes to be reconstituted, and then eaten. As the method for evaluating the noodles by eating them, the noodles were evaluated by five experienced panelists. The panelists discussed the texture and flavor of the noodles. The comprehensive evaluation was performed on a scale on which 4 is perfection.

Regarding points of the comprehensive evaluation, 4 points show that both a fresh noodle-like texture and a wheat flour flavor are good, 3 points show that one of the fresh noodles-like texture and the wheat flour flavor is not so good, 2 points show that both the fresh noodles-like texture and the wheat flour flavor are not so good, and 1 point shows that both the fresh noodles-like texture and the wheat flour flavor are bad. It is determined that if the noodles get the highest point that is 4 points, a general consumer can adequately recognize the effects of the superheated steam and be differentiated from conventional products. Thus, 4 points is regarded as the passing point.

Note that the degree of gelatinization was measured in the same manner as Example 1.

Example 4

Example 3 includes the steps of the superheated steam steaming, the water shower, and the superheated steam steaming. In Example 4, the steps of the water shower and the superheated steam steaming were added to Example 3. To be specific, a sample was produced as Example 4 in the same manner as Example 1 by carrying out the superheated steam steaming three times.

Comparative Example 4

Example 3 includes the steps of the superheated steam steaming, the water shower, and the superheated steam steaming. In Comparative Example 4, the superheated steam steaming was carried out only once, the steps after the first moisture supplying step of Example 3 were not carried out, but the drying process was carried out by the hot-air drying. To be specific, a sample was produced as Comparative Example 4 in the same manner as Example 3 by carrying out the superheated steam steaming once.

Comparative Example 5

Comparative Example 4 includes the step of carrying out the superheated steam steaming once. In Comparative Example 5, the saturated steam was used instead of the superheated steam of Comparative Example 4. A sample was produced as Comparative Example 5 by carrying out the saturated steam steaming once for 30 seconds. In this case, the steam flow rate was 200 kg/h, the temperature of the steam to which the noodle strings were exposed was about 100° C., and the steaming was carried out using the same steam chamber as Examples 3 and 4 and Comparative Example 4.

Comparative Example 6

Comparative Example 5 includes the step of carrying out the saturated steam steaming once. In Comparative Example 6, the saturated steam steaming was carried out twice under the same conditions as those of Comparative Example 5. A sample was produced as Comparative Example 6 by carrying out the same water shower as Example 3 between two saturated steam steaming steps.

Results of Examples 3 and 4 and Comparative Examples 4 to 6 are shown in Table 2.

TABLE 2

|  | Example 3 | Example 4 | Comparative Example 4 | Comparative Example 5 | Comparative Example 6 |
|---|---|---|---|---|---|
| Sensory Evaluation Score | 4 | 4 | 2.5 | 1 | 2.5 |
| Sensory Evaluation Comment | Cooked well. Good wheat flavor. | Cooked well. Good wheat flavor. | Mealy | Noodles are not adequately cooked. No wheat flavor. | Noodles are not adequately cooked. No wheat flavor. |
| Degree of gelatinization after steaming | 59.2% | 72.0% | 50.9% | 54.4% | 58.5% |

Experiment 3: Verification of Effects of Fried Noodles by Different Steam-Boiling Times and Temperatures of Superheated Steam Comparative Example 7

Example 2 of the instant fried noodles includes the steps of the superheated steam steaming, the water shower, the superheated steam steaming, the water shower, and the superheated steam steaming. In Comparative Example 7, a time for spraying the superheated steam in the superheated steam steaming of Example 2 was changed from 30 seconds to 60 seconds. To be specific, a sample was produced as Comparative Example 7 in the same manner as Example 2 by carrying out the superheated steam steaming for 60 seconds.

Comparative Example 8

Each of Example 2 and Comparative Example 7 of the instant fried noodles includes the steps of the superheated steam steaming, the water shower, the superheated steam steaming, the water shower, and the superheated steam steaming. In Comparative Example 8, the temperature of the superheated steam in the superheated steam steaming of Example 2 was changed from 140 to 110° C. To be specific, a sample was produced as Comparative Example 8 in the same manner as Example 2 by carrying out the superheated steam steaming at 110° C.

Results of Example 2 and Comparative Examples 7 and 8 are shown in Table 3. The sensory evaluation and the method for measuring the degree of gelatinization were the same as those in Experiment 1.

TABLE 3

|  | Example 2 | Comparative Example 7 | Comparative Example 8 |
|---|---|---|---|
| Temperature, Time | 140° C., 30 sec | 140° C., 60 sec | 110° C., 30 sec |
| Sensory Evaluation Score | 4 | 3 | 1.5 |

TABLE 3-continued

|  | Example 2 | Comparative Example 7 | Comparative Example 8 |
| --- | --- | --- | --- |
| Sensory Evaluation Comment | Both the cooked noodle state and the texture are good. | Core is a little hard. | Hot water does not soak and noodle surfaces are rough. |
| Degree of gelatinization after steaming | 59.1% | 68.9% | 64.1% |

In Comparative Example 7 of Experiment 3, the core was a little hard. This may be because since the steaming time of the superheated steam was long, the noodle strings became dry, and the center portion of each noodle string did not become suitable for eating.

Experiment 4: Verification of Effects by Different Methods for Spraying Superheated Steam to Noodle Strings Example 2 of the instant fried noodles includes the steps of the superheated steam steaming, the water shower, the superheated steam steaming, the water shower, and the superheated steam steaming. In comparative experiments, the method for spraying the superheated steam of the superheated steam steaming in Example 2 was changed as below.

Example 5

Example 5 was carried out in the same manner as Example 2. Regarding the spraying of the superheated steam to the noodle strings, the ejection holes configured to open under the noodle strings to spray the superheated steam were turned such that the superheated steam ejected from under the noodle strings was not directly sprayed to the noodle strings. To be specific, the superheated steam was directly sprayed to the noodle strings from above the noodle strings and was indirectly supplied to the noodle strings from under the noodle strings. As the condition of the superheated steam, high-temperature steam of 250° C. was generated and supplied at the steam flow rate of 160 kg/h to the tunnel type steam chamber in which the net conveyor moves. This was the same as Example 2. The temperature to which the noodle strings were exposed was confirmed by the monitoring of Example 2.

Example 6

In Example 5, the superheated steam was directly sprayed to the noodle strings from above the noodle strings and indirectly supplied to the noodle strings from under the noodle strings. Instead of this, in Example 6, the upper ejection holes were closed, and only the lower ejection holes directly sprayed the superheated steam to the noodle strings. The other conditions in Example 6 were the same as those in Example 5.

Comparative Example 9

In Example 6, the superheated steam was directly sprayed to the noodle strings only from under the noodle strings. In Comparative Example 9, the ejection holes for directly spraying the superheated steam from under the noodle strings were turned such that the superheated steam ejected from under the noodle strings was not directly sprayed to the noodle strings.

Results of Examples 5 and 6 and Comparative Example 9 were shown in Table 4. The degree of gelatinization was not measured.

TABLE 4

|  | Spraying from above noodle strings | Spraying from under noodle strings | Temperature | Evaluation |
| --- | --- | --- | --- | --- |
| Example 2 | Direct | Direct | 141° C. | Both cooked noodle state and texture are good. |
| Example 5 | Direct | Indirect | 142° C. | Both cooked noodle state and texture are not so bad. |
| Example 6 | None | Direct | 144° C. | Both cooked noodle state and texture are not so bad. |
| Comparative Example 9 | None | Indirect | 144° C. | Both cooked noodle state and texture are bad. |

Example 7

Production Example Using Mixture of Superheated Steam and Saturated Steam 350 ml of the kneading water in which 20 g of salt and 8 g of brine water were dissolved was added to 1 kg of the noodle material powder made of 880 g of wheat flour and 120 g of starch. This was adequately kneaded by the mixer to obtain the noodle dough. The obtained noodle dough was shaped and combined to form the noodle belt. The noodle belt was repeatedly rolled out to become the noodle belt having the final thickness of 1.15 mm. The noodle belt was cut by a cutting blade of a round blade No. 18.

The cut raw noodle strings were steamed by spraying the superheated steam flow to the noodle strings and mixing the saturated steam in the steam chamber at the same time in the first steaming step. As the condition of the superheated steam, high-temperature steam of 250° C. was generated and supplied at the steam flow rate of 160 kg/h to the tunnel type steam chamber in which the net conveyor moves. Meanwhile, the saturated steam of 100° C. was supplied at the steam flow rate of 200 kg/h from a lower portion of the steam chamber such that the steam chamber was filled with the saturated steam.

The steam chamber includes the ejection holes configured to directly spray the superheated steam flow from upper side and lower side of the net conveyor to the noodle strings transferred on the conveyor. Many ejection holes are arranged in the proceeding direction of the conveyor. The superheated steam flow was directly sprayed from the ejection holes to the noodle strings. Meanwhile, many holes though which the saturated steam was supplied were arranged at the lower portion of the steam chamber in the proceeding direction of the conveyor. The saturated steam was supplied through the holes into the steam chamber. The holes of the saturated steam were configured such that the saturated steam ejected in a downward direction in the steam chamber and did not directly contact the noodle strings.

The method for measuring the temperature of the superheated steam to which the noodle strings are exposed was to place the temperature sensor on the surfaces of the noodle strings to monitor the temperature of the superheated steam to which the noodle strings are exposed in the steam chamber. The temperature of the superheated steam to which the noodle strings are exposed was 125 to 130° C., and the steaming time was 45 seconds.

Immediately after the noodles steamed by spraying the superheated steam and adding the saturated steam were discharged from the steam chamber by the conveyor, hot water of 60° C. was showered to the noodles to supply the moisture in the first moisture supplying step.

Next, the steaming using only the saturated steam was carried out in the second steaming step. The steaming method was to supply to the tunnel-type steam chamber the steam generated by a boiler to fill the steam chamber with the saturated steam. The temperature of the saturated steam was 100° C., the steaming time was 45 seconds, and the steam flow rate was 200 kg/h.

The steamed noodles steamed as above were immersed in a seasoning liquid, i.e., a lightly salted water. The noodle strings were cut and filled in a retainer having a capacity of 380 ml and fried using palm oil of about 150° C. Thus, the noodle strings were dried.

The instant fried noodles produced as above were cooled down and stored as a sample of Example 7. The weight of the sample was 74 g.

The sample was put in the polystyrene container. 400 ml of the boiling water was poured into the container, and the lid of the container was closed. The sample was left for three minutes to be reconstituted, and then eaten. As a result, the texture which cannot be obtained only by the normal saturated steam could be obtained. To be specific, the noodles had fresh noodle-like excellent texture, i.e., had soft noodle surfaces and hard center portion, and the cooked noodle state was also good.

INDUSTRIAL APPLICABILITY

In accordance with the present invention, it is possible to produce with high productivity the instant noodles having fresh noodle-like texture and flavor and an excellent reconstitution property even in a case where the noodles are thick.

The invention claimed is:

1. A method for producing instant noodles, comprising:
    a first steaming step of steaming raw noodle strings by directly spraying superheated steam flow on the raw noodle strings for 5 to 50 seconds such that a temperature of superheated steam to which surfaces of the noodle strings are exposed becomes 125 to 220° C.;
    a first moisture supplying step of supplying moisture to the noodle strings by using water or hot water after the first steaming step;
    a second steaming step of steaming the noodle strings after the first moisture supplying step by directly spraying superheated steam flow on the noodle strings for 5 to 50 seconds, and/or steaming the noodle strings after the first moisture supplying step by using non-superheated steam; and
    a drying step of drying the noodle strings after the second steaming step to produce the instant noodles.

2. The method according to claim 1, wherein in the first steaming step, the superheated steam flow is sprayed and non-superheated steam is used at the same time.

3. The method according to claim 1 or 2, further comprising:
    a second moisture supplying step of supplying moisture to the noodle strings by using water or hot water after the second steaming step; and
    a third steaming step of steaming the noodle strings after the second moisture supplying step by directly spraying superheated steam flow on the noodle strings for 5 to 50 seconds, and/or steaming the noodle strings after the second moisture supplying step by using non-superheated steam.

4. The method according to claim 1 or 2, wherein the drying step is a step of drying the noodle strings by a fry drying process, a hot-air drying process, or a freeze dry process.

5. the method according to claim 3, where in the drying step is a step of drying the noodle strings by a fry drying process, a hot-air drying process, or a freeze dry process.

* * * * *